United States Patent
Ryser

(10) Patent No.: US 12,065,980 B2
(45) Date of Patent: Aug. 20, 2024

(54) MIXTURE-FEEDING SYSTEM FOR AN INTERNAL COMBUSTION ENGINE, HAVING QUANTITATIVE MIXTURE CONTROL

(71) Applicant: TURBO SYSTEMS SWITZERLAND LTD., Baden (CH)

(72) Inventor: Raphael Ryser, Baden (CH)

(73) Assignee: TURBO SYSTEMS SWITZERLAND LTD., Baden (CH)

( * ) Notice: Subject to any disclaimer, the term of this patent is extended or adjusted under 35 U.S.C. 154(b) by 0 days.

(21) Appl. No.: 17/786,315

(22) PCT Filed: Dec. 8, 2020

(86) PCT No.: PCT/EP2020/085077
§ 371 (c)(1),
(2) Date: Jun. 16, 2022

(87) PCT Pub. No.: WO2021/122156
PCT Pub. Date: Jun. 24, 2021

(65) Prior Publication Data
US 2024/0011447 A1    Jan. 11, 2024

(30) Foreign Application Priority Data

Dec. 20, 2019  (EP) .................................... 19218852

(51) Int. Cl.
*F02D 41/00* (2006.01)
*F02B 29/04* (2006.01)
(Continued)

(52) U.S. Cl.
CPC ...... *F02D 41/0007* (2013.01); *F02B 29/0412* (2013.01); *F02B 37/004* (2013.01);
(Continued)

(58) Field of Classification Search
CPC .. F02D 41/0007; F02D 13/0223; F02D 19/02; F02D 41/0027; F02D 2041/001;
(Continued)

(56) References Cited

U.S. PATENT DOCUMENTS

| 2004/0182346 A1* | 9/2004 | Eiraku | F01L 1/34 123/90.11 |
| 2016/0069286 A1* | 3/2016 | Zielinski | F02D 43/00 123/445 |
| 2018/0223748 A1* | 8/2018 | Tulapurkar | F02D 35/027 |

FOREIGN PATENT DOCUMENTS

| DE | 102012014713 A1 | 1/2014 |
| EP | 1905988 A2 | 4/2008 |

(Continued)

OTHER PUBLICATIONS

English Translation of the International Search Report and Written Opinion in International Application No. PCT/EP2020/085077, mailed on Mar. 3, 2021, 2 pages.

(Continued)

*Primary Examiner* — J. Todd Newton
(74) *Attorney, Agent, or Firm* — Meunier Carlin & Curfman LLC

(57) ABSTRACT

A mixture supply system with quantitative mixture control comprises a charging system connectable to an internal combustion engine, comprising a bypass and a bypass valve, and a valve train for periodically actuating an intake valve of the internal combustion engine. A valve control time of the intake valve is controllable by the valve train. The system is configured to at least partially close the bypass valve and change the valve control time for extending the valve opening duration upon increase of an engine load, to at least partially open the bypass valve during and/or after expiration of a valve train latency time, and/or to at least partially open the bypass valve and change the valve control (Continued)

time for decreasing the valve opening duration upon an decrease of an engine load, and to at least partially close the bypass valve during and/or after expiration of a valve train latency time.

14 Claims, 4 Drawing Sheets

(51) Int. Cl.
| | |
|---|---|
| *F02B 37/00* | (2006.01) |
| *F02B 37/013* | (2006.01) |
| *F02B 37/16* | (2006.01) |
| *F02B 37/18* | (2006.01) |
| *F02D 13/02* | (2006.01) |
| *F02D 19/02* | (2006.01) |

(52) U.S. Cl.
CPC .......... *F02B 37/013* (2013.01); *F02B 37/162* (2019.05); *F02B 37/18* (2013.01); *F02D 13/0223* (2013.01); *F02D 19/02* (2013.01); *F02D 41/0027* (2013.01); *F02D 2041/001* (2013.01); *F02D 2041/002* (2013.01)

(58) Field of Classification Search
CPC ............ F02D 2041/002; F02B 29/0412; F02B 37/004; F02B 37/013; F02B 37/162; F02B 37/18
See application file for complete search history.

(56) References Cited

FOREIGN PATENT DOCUMENTS

| | | |
|---|---|---|
| EP | 2910755 A1 | 8/2015 |
| EP | 3109444 A1 | 12/2016 |
| EP | 3431740 A1 | 1/2019 |
| WO | 2017023333 A1 | 2/2017 |

OTHER PUBLICATIONS

Office Action in connection to CN Application No. CN 202080096388. 3, dated Apr. 10, 2024.

\* cited by examiner

MIXTURE-FEEDING SYSTEM FOR AN INTERNAL COMBUSTION ENGINE, HAVING QUANTITATIVE MIXTURE CONTROL

CROSS REFERENCE TO RELATED APPLICATIONS

This application is a United States National Phase Patent Application of International Patent Application Number PCT/EP2020/085077, filed on Dec. 8, 2020, which claims the benefit of priority to EP Application No. 19218852.2, filed Dec. 20, 2019

TECHNICAL FIELD

The invention relates to a mixture supply system for an internal combustion engine with quantitative mixture control, and a method of operating a mixture supply system for an internal combustion engine with quantitative mixture control.

BACKGROUND

Internal combustion engines, in particular gas and dual-fuel engines based on the Otto cycle, operate within a defined range of excess air ratio. The operating limits or physical limits are given by unstable ignition at high excess air ratios and uncontrolled combustion due to phenomena such as autoignition and knocking at low excess air ratios. In addition, emission regulations limit the limit for maximum excess air ratios.

For these reasons, there is a need for controlled adjustment of the excess air ratio in the cylinders of internal combustion engines, both during an interval when an engine load is constant and when there are changes, particularly abrupt changes, in the engine load. From the prior art it is known to control the filling of the cylinders by adjusting the delivery pressure of the air flow (or mixture flow). An alternative to this is to control the filling of the cylinders via the intake valve.

The adjustment of the delivery pressure is done, for example, via a throttle valve in the air path (or mixture path), and by providing a charging system comprising a turbocharger and one or more bypass configurations, i.e. via a control of the turbocharger pressure.

The systems based on adjusting the delivery pressure by means of bypasses generate losses, either by dissipation of flow energy in the throttle valve or by wasting enthalpy on a turbine side of the turbocharger or recirculation losses on a compressor side of the turbocharger. An alternative to this is based on variable turbine geometry (VTG), but this suffers from reduced efficiency, is technically complex and costly.

The filling of the cylinders via the intake valve is often controlled by varying the closing time of the intake valve. For example, WO 2008/000899 A1 discloses a control arrangement for a gas exchange valve in a piston engine. Here, a hydraulic medium is provided to delay the closing of the valve.

Some of these systems can provide partial or full variability in the timing of the intake valve, but not with the speed required for excess air ratio controllers. Devices for controlling the closing timing of the intake valve therefore have the disadvantage that they are often slow and sluggish, or that fast-response systems are very complex and costly.

In view of the foregoing, there is a need for an improved mixture supply system for an internal combustion engine.

SUMMARY OF THE INVENTION

This object is at least partially solved by a mixture supply system for an internal combustion engine with quantitative mixture control according to claim 1. Further, the object is solved by a method for operating a mixture supply system for an internal combustion engine with quantitative mixture control according to claim 14. Further embodiments, modifications and improvements result from the following description and the appended claims.

According to one embodiment, a mixture supply system for an internal combustion engine with quantitative mixture control, in particular a gas engine or a dual-fuel engine, is provided. The mixture supply system includes a charging system connectable to the internal combustion engine, including a bypass and a bypass valve arranged in the bypass. Further, the mixture supply system includes a valve train for periodically actuating an intake valve of the internal combustion engine, wherein a valve control time of the intake valve is controllable by the valve train. The mixture supply system is configured to at least partially close the bypass valve and change the valve control time for extending the valve opening duration upon an increase of an engine load, and to at least partially open the bypass valve during and/or after expiration of a valve train latency time; and/or to at least partially open the bypass valve and change the valve control time for a reduction of the valve opening duration upon a reduction of the engine load, and to at least partially close the bypass valve during and/or after expiration of a valve train latency time.

Upon the increase in engine load, additional thermal energy is provided to the charging system by increasing the amount of fuel. With an unchanged opening degree of the bypass valve, the turbocharger pressure or the delivery pressure increases, but nevertheless the required amount of air and/or mixture increases more than that provided by the turbocharging system. To keep the excess air ratio within defined limits, the mixture supply system can therefore be configured to partially close the bypass valve or reduce the opening degree of the bypass valve upon the engine load increases. Upon the engine load is reduced, less thermal energy is provided to the charging system. If the opening degree of the bypass valve remains unchanged, the turbocharger pressure or the delivery pressure is reduced, but not to the extent required to maintain the excess air ratio within defined limits. Therefore, the mixture supply system may be configured to partially open the bypass valve or increase the opening degree of the bypass valve upon the engine load is reduced.

The valve train latency time corresponds to a period between a change in the valve control time and a time when the change in the valve control time takes full effect. In other words, the valve train may include a certain amount of inertia, i.e., after a change in the valve control time of the intake valve, a certain amount of time may elapse before the change in the valve control time occurs in its intended manner. By changing the engine load, i.e., when the engine load increases or decreases, a controlled adjustment of the excess air ratio in the cylinders of internal combustion engines is needed even on a short time scale to operate within the operating limits or physical limits, and to avoid harmful effects such as an increase in NOx-emission. The inertia of known valve trains, without providing additional means to adjust the excess air ratio, results in adverse effects within the valve train latency time. The valve train latency time lasts longer than a single cycle. For example, a typical valve train latency time may be approximately 5-10 duty cycles.

The bypass valve arranged in the bypass is advantageously configured to react quickly, in particular within a fraction of a valve train latency time. By partially or fully closing the bypass valve upon the engine load increases, the excess air ratio in the cylinders can be adjusted within the operating limits during the valve train latency time. At or after the end of the valve train latency time, the mixture supply system can be configured to at least partially open the bypass valve. Advantageously, this enables the excess air ratio to be controlled predominantly or even completely by the valve train at or after expiration of the valve train latency time.

According to the invention, the mixture supply system is configured to at least partially close the bypass valve immediately upon an increase in the engine load and to change the valve control time for an extension of the valve opening duration (and correspondingly to at least partially open the bypass valve immediately upon a decrease in the engine load and to change the valve control time for a reduction in the valve opening duration). Upon the engine load increases, the bypass valve is at least partially closed and the valve control time is changed substantially simultaneously; thus, actuation of the bypass valve and the valve control time occurs substantially simultaneously (typically within the same operating cycle). This allows pre-compensation of the rather sluggish valve train (which requires several operating cycles after actuation until the change in valve control time occurs in its intended manner) by the much faster responding bypass valve to operate within operating limits.

In one embodiment, the mixture supply system is configured to at least partially close the bypass valve in a first half of the valve train latency time upon the engine load increases, and/or to at least partially open the bypass valve in the first half of the valve train latency time upon the engine load decreases.

By partially opening the bypass valve when reducing the engine load, the excess air ratio in the cylinders can be adjusted within the operating limits, during the valve train latency time. At or after the end of the valve train latency time, the mixture supply system may be configured to at least partially close the bypass valve. Advantageously, this enables the excess air ratio to be controlled predominantly or even completely by the valve train at or after the end of the valve train latency time.

At a constant or steady-state engine load, the bypass valve may be slightly open or nearly closed. In other words, the opening degree of the bypass valve may be very small at a constant engine load. This allows the bypass valve to be closed further when the engine load increases, i.e. the opening degree of the bypass valve can be reduced. In particular, at a constant engine load, the opening degree of the bypass valve according to embodiments of the present disclosure is substantially lower than in mixture supply systems that includes a bypass valve but do not provide additional means for adjusting the excess air ratio. By allowing the bypass valve to be slightly open or nearly closed at a constant or steady-state engine load, energy losses, particularly from wasted enthalpy on a turbine side of the turbocharger or recirculation losses on a compressor side of the turbocharger, are very minor. Especially for large, medium-speed internal combustion engines, the reduction of energy losses, and thus lower fuel consumption, are of considerable importance.

When using the mixture supply system for the internal combustion engine, changing engine load requirements may occur frequently. For example, an increase in engine load may be desired following an interval of constant or steady-state engine load, followed by a further increase or decrease in engine load. According to a general aspect, it is provided that the mixture supply system is configured to at least partially open the bypass valve or to adjust the opening degree of the bypass valve such that, in the event of a renewed increase in the engine load, the bypass can be sufficiently closed or the opening degree of the bypass valve can be sufficiently reduced, respectively, during and/or after expiration of a valve train latency time. According to one embodiment, a first opening degree of the bypass valve before the increase of the engine load and a second opening degree during and/or after the expiration of the valve train latency time are substantially the same. In other words, a fixable opening degree may be provided for a steady-state engine load, wherein during and/or after expiration of the valve train latency time, the mixture supply system may be configured to adjust the fixable opening degree.

According to a general aspect, the mixture supply system may be adapted to at least partially close the bypass valve upon an abrupt increase in engine load and to change the valve control time for extending the valve opening duration, and to at least partially open the bypass valve during and/or after expiration of the valve train latency time. For slower changes in engine load, for example changes in environmental conditions such as a temperature and/or a pressure and/or a gas quality, provision may be made to leave the opening degree of the bypass valve unchanged. For slower changes in engine load, the mixture supply system may be configured to change the valve control time to extend the valve opening duration.

According to one embodiment, the mixture supply system includes a control unit. The control unit may be configured to adjust the opening degree of the bypass valve and/or to change the valve control time of the intake valve by the valve train. In particular, the control unit may be configured to adjust the opening degree of the bypass valve and to change the valve control time of the intake valve by the valve train upon the engine load increases and/or upon the engine load decreases.

The control unit may further be configured to adjust the opening degree of the bypass valve during and/or after the valve train latency time, depending on a parameter. The parameter may be suitable for determining whether the valve train latency time has expired. The parameter may be suitable for determining a quantity of air and/or mixture required by means of the bypass, or for determining a reduction in the quantity of air and/or mixture required by means of the bypass. For example, the parameter may be a fuel-air ratio or a fuel-air ratio in a combustion chamber of the internal combustion engine estimated from measured variables. In another exemplary embodiment, the parameter is a boost pressure. In this case, the boost pressure is representative of the amount of air in the cylinder.

The bypass valve may be a throttle valve. Further, the bypass valve may be incrementally or infinitely adjustable. The control unit may further be configured to adjust, during and/or after the valve train latency time, the opening degree of the bypass valve in a stepwise or stepless manner. During the valve train latency time, the change in the valve control time can unfold its effect stepwise or steplessly until, at the end of the period, the change in the valve control time unfolds its full effect. The control unit may further be configured to adjust, during and/or after the valve train latency time, the opening degree of the bypass valve stepwise or steplessly depending on the parameter.

The charging system may include one or more turbochargers. Each turbocharger may include a compressor and a turbine connected to the compressor by means of a turbocharger shaft. The charging system may be connectable to an inlet manifold and/or an exhaust manifold of the internal combustion engine with quantitative mixture control. In particular, an outlet region of the compressor may be connectable to the inlet manifold and an inlet region of the turbine may be connectable to the exhaust manifold. An intercooler and/or a throttle device, for example a throttle valve, can be arranged in a connecting line connected to the outlet region of the compressor and connectable to the inlet manifold. An air intake device may be connected to an inlet region of the compressor and/or a gas mixer may be connected, wherein the gas mixer includes the air intake device and a gas supply system. The bypass may thereby connect the outlet region of the compressor to the inlet region of the compressor, and/or the bypass may thereby connect the inlet region of the turbine to the outlet region of the turbine. The "and" case should be understood to mean that the bypass includes two separate lines, an air return line or mixture return line and an exhaust bypass line. Both the air return line or mixture return line and the exhaust bypass line preferably each include a bypass valve.

The charging system may further include at least two turbochargers, wherein the bypass may connect an inlet region of a turbine of the first turbocharger to an outlet region of a turbine of the second turbocharger and/or an outlet region of a compressor of the first turbocharger to an inlet region of a compressor of the second turbocharger.

For example, the charging system may include a low-pressure turbocharger and a high-pressure turbocharger. The air intake device may be connected to an inlet portion of the low-pressure compressor and/or the gas mixer may be connected, wherein the gas mixer includes the air intake device and the gas supply. The charging system may include a conduit for connecting an outlet region of the low-pressure compressor to an inlet region of the high-pressure compressor. An intercooler may be disposed in the conduit.

The valve train may be configured to time shift actuation of the intake valve. Thus, a time shifting of the valve stroke can be performed, in particular for the controller of the cylinder charge. The time shifting of the closing movement of the intake valve can be infinitely adjustable. This enables precise adjustment of the cylinder charge, in particular the cylinder pressure. As a result, the individual cylinders can also be made equal to one another.

The valve train can be configured to time shift a closing movement of the intake valve. The temporal shifting of the closing movement of the intake valve can be infinitely adjustable. This enables precise adjustment of the filling of the cylinder, in particular of the cylinder pressure.

According to one embodiment, the valve train further includes a delay element for shifting the closing movement of the intake valve. In particular, the delay element may be a mechanical delay element or a hydraulic delay element. The delay element may include a hydraulic chamber for displacing the closing movement of the intake valve by means of a hydraulic medium. The valve train may include an intake valve actuating mechanism, wherein the intake valve actuating mechanism may be configured to be in contact with the delay element for shifting a closing movement of the intake valve with respect to time. For example, the intake valve actuation mechanism may include at least one selected from a rocker arm, a drag lever, a push rod, and a valve bridge, wherein the delay element may be in contact with the rocker arm or the drag lever or the push rod or the valve bridge.

Further, as an alternative or supplement to the timing of the closing movement of the intake valve or the timing of the valve lift, the valve lift may be adjusted to control the cylinder charge. Thus, the valve train may be configured to adjust the valve lift.

The preceding described embodiments, related to components of the intake valve and/or components of the valve train are correspondingly transferable to an exhaust valve of the internal combustion engine.

The internal combustion engine with quantitative mixture control may be a stationary internal combustion engine or a propulsion engine. The internal combustion engine may be an Otto engine, and in particular, the internal combustion engine may be a four-stroke engine. The combustion engine with quantitative mixture control may be a gas engine or a dual-fuel engine. A gas supply of the gas engine or the dual-fuel engine may be provided via the charging system by means of the gas supply connected to the gas mixer and/or via a separate gas injection, in particular via the gas injection connected to the inlet manifold. The gas injection can also take place via an intake duct arranged between the intake manifold and the cylinder (intake manifold injection).

According to one embodiment, an internal combustion engine with quantitative mixture control, in particular a gas engine or a dual-fuel engine, is provided. The internal combustion engine includes a mixture supply system according to one of the embodiments described herein. In this regard, the internal combustion engine may include a plurality of cylinders and a valve train for periodically actuating one or more intake valves for each cylinder of the internal combustion engine.

The embodiments described herein can be implemented with minor design effort, particularly for mixture supply systems that already include valve trains in which a valve control time of the intake valve is controllable by the valve train. As a result, an improved mixture supply system can be achieved in a simple and cost-effective manner.

According to one embodiment, a method for operating a mixture supply system for an internal combustion engine with quantitative mixture control is provided. In particular, the combustion engine with quantitative mixture control may be a gas engine or a dual-fuel engine. The mixture feed system includes a charging system connectable to the internal combustion engine, including a bypass and a bypass valve arranged in the bypass. Further, the mixture supply system includes a valve train for periodically actuating an intake valve of the internal combustion engine, wherein a valve control time of the intake valve is controllable by the valve train. In particular, the internal combustion engine may include the mixture supply system according to any of the embodiments described herein.

The method includes:
A) Upon the increase of an engine load:
   A1) partially closing the bypass valve and shifting the valve control time to increase the valve opening duration; and
   A2) partially opening the bypass valve during and/or after expiration of a valve train latency time; and/or
B) Upon the reduction of the engine load:
   B1) Partially opening the bypass valve and shifting the valve control time to shorten the valve opening time; and
   B2) Partially closing the bypass valve during and/or after expiration of a valve train latency time.

Step A2) occurs after step A1). Step B2) occurs after step B1). Steps A2) and/or B2) can be adjusted depending on the fuel-air ratio.

BRIEF DESCRIPTION OF THE FIGURES

In the following, the invention is explained in more detail with reference to embodiments, without these being intended to limit the scope of protection defined by the claims.

The accompanying drawings illustrate embodiments and, together with the description, serve to explain the principles of the invention. The elements of the drawings are relative to each other and not necessarily to scale. Identical reference signs designate correspondingly similar parts.

The figures show:

FIG. 1 shows a part of a mixture supply system according to the invention, according to one embodiment.

FIG. 2 shows a part of a mixture supply system according to the invention according to one embodiment.

FIG. 3 shows a part of a mixture supply system according to the invention according to one embodiment.

FIG. 4 shows a part of a mixture supply system according to the invention according to one embodiment.

DETAILED DESCRIPTION

FIGS. 1 to 4 show—in schematic representation—parts of various embodiments of a mixture supply system 100, 300, 400, 500 according to the invention for an internal combustion engine 200 with quantitative mixture control, in particular a gas engine or a dual-fuel engine.

The dashed arrows in FIGS. 1 to 4 indicate the assignment of the reference signs to the features. The bold arrows drawn as solid lines in FIGS. 1 to 4 indicate a flow direction.

The figures illustrate parts of the mixture supply system 100, 300, 400, 500 according to the invention, in particular a charging system 110, 310, 410, 510, and show exemplary parts of the internal combustion engine connectable to the mixture supply system 100, 300, 400, 500.

Figure 1:
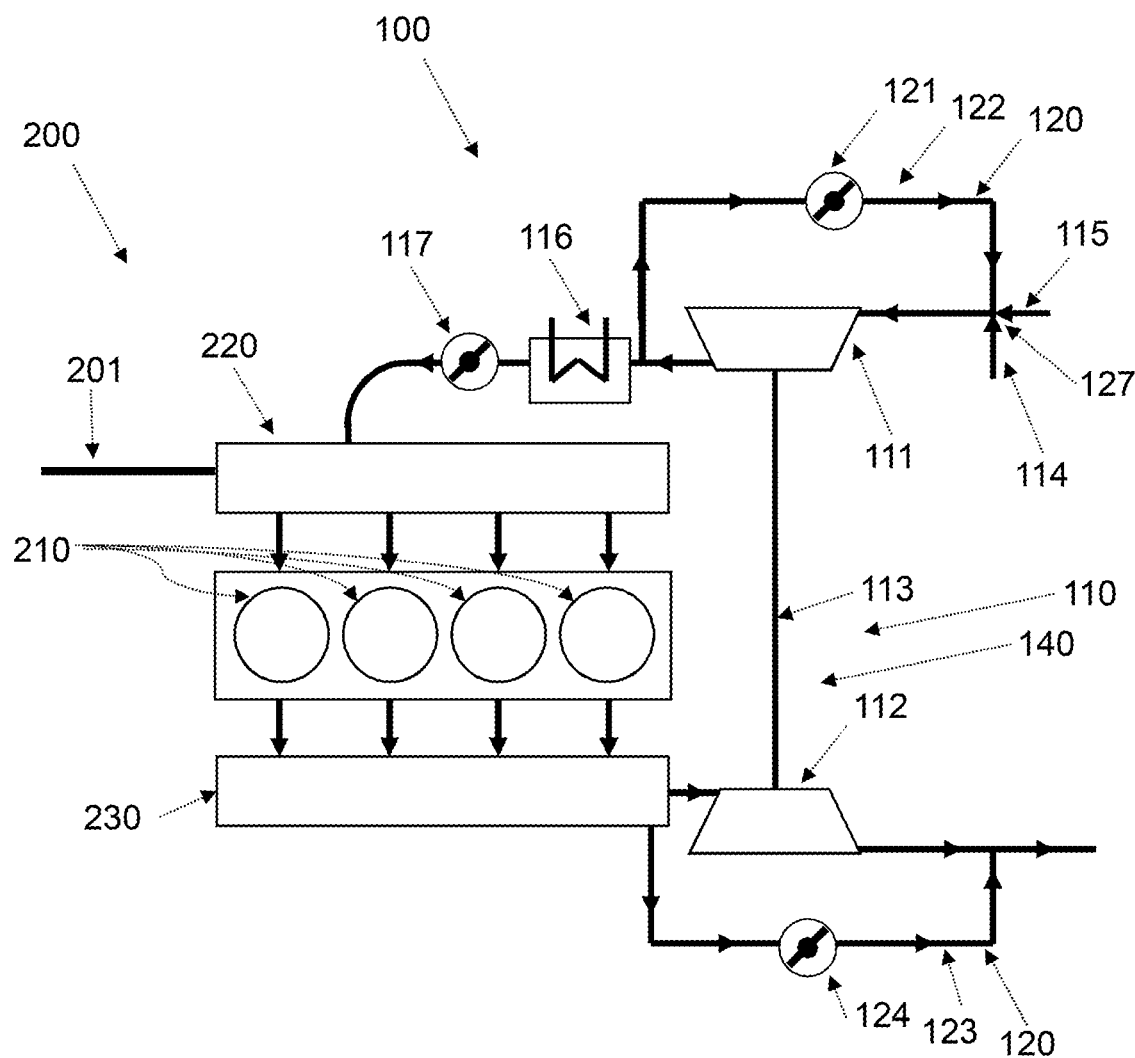

FIG. 1 illustrates the mixture supply system 100. The mixture supply system 100 includes a valve train for periodically actuating an intake valve of the internal combustion engine 200, wherein a valve control time of the intake valve is controllable by the valve train (not shown).

Further, the mixture supply system 100 includes a charging system 110 connectable to the internal combustion engine 200. The charging system may include a turbocharger 140, wherein the turbocharger includes a compressor 111 and a turbine 112 connected by a turbocharger shaft 113. An inlet region of the turbine 112 may be connectable to an exhaust manifold 230. An outlet portion of the compressor 111 may be connectable to an inlet manifold 220 of the internal combustion engine 200 by means of a connecting line. An intercooler 116 and/or a throttle valve 117 may be connected in the connection line. A gas mixer 127 may be connected to an inlet portion of the compressor 111, wherein the gas mixer 127 includes a gas supply 114 and/or an air intake device 115.

The charging system 110 includes a bypass 120. The bypass 120 may include a mixture return line 122 and an exhaust gas bypass line 123. A bypass valve 121, 124 is arranged in the bypass. In particular, a bypass valve 121, 124 are arranged in the mixture return line 122 and in the exhaust gas bypass line 123, respectively. The bypass 120 may connect the inlet portion of the turbine 112 of the turbocharger 140 to the outlet portion of the turbine 112 of the turbocharger 140, and the outlet portion of the compressor 111 of the turbocharger 140 to the inlet portion of the compressor 111 of the turbocharger 140.

The internal combustion engine 200 may include at least one cylinder 210. The at least one cylinder may be connected to the inlet manifold 220 and/or the exhaust manifold 230. The internal combustion engine 200 may include at least one intake valve, wherein the intake valve may be disposed between the inlet manifold 220 and the cylinder 210 (not shown). The intake valve may be periodically actuated by the valve train, wherein a valve control time of the intake valve is controllable by the valve train. A gas supply of the internal combustion engine 200 may be provided via the charging system 110 by means of the gas supply 114 connected to the gas mixer 127 and/or via a separate gas injection 201, in particular via the gas injection 201 connected to the inlet manifold 220.

Figure 2:
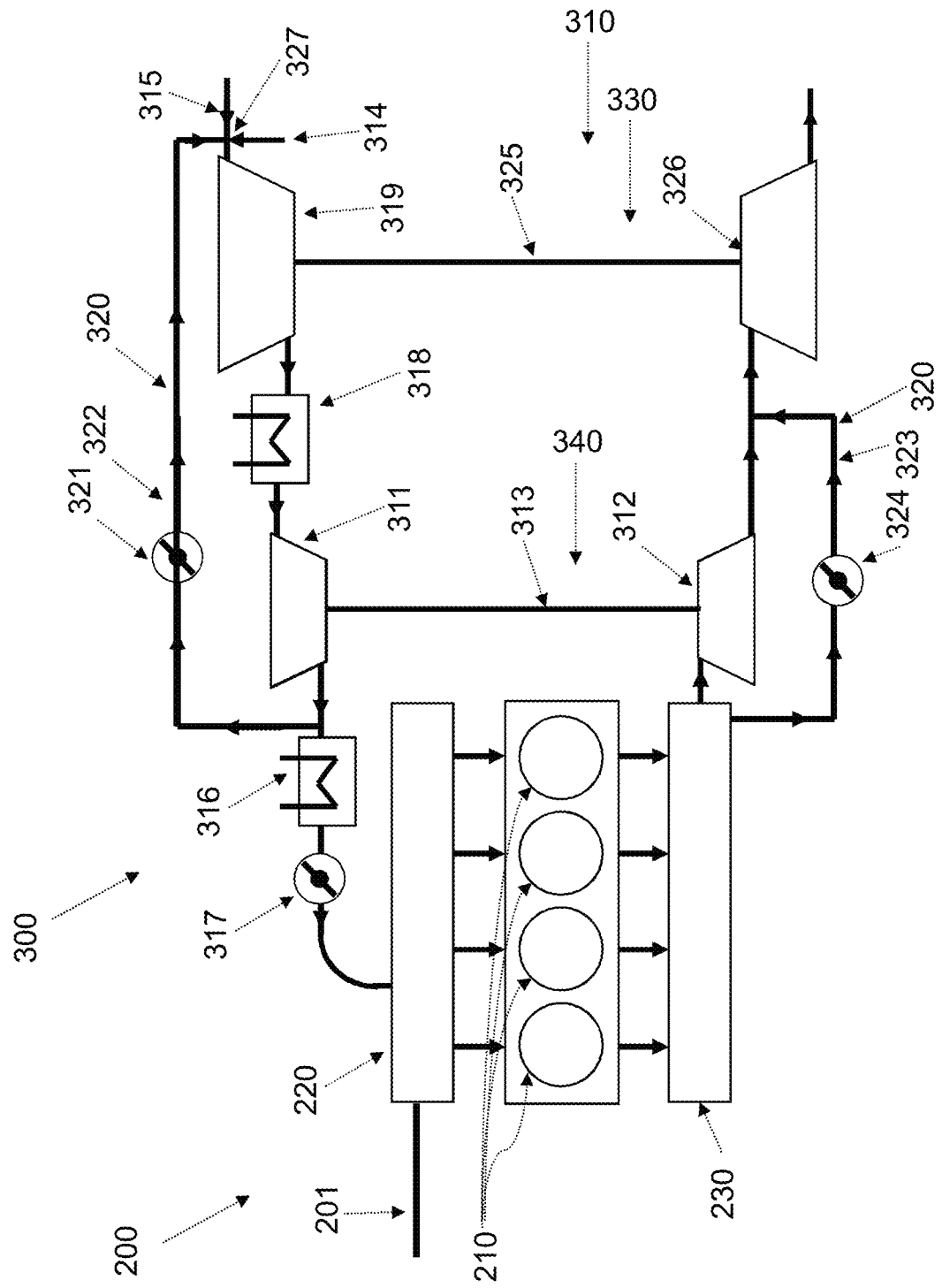

FIG. 2 illustrates the mixture supply system 300. The mixture supply system 300 includes a valve train for periodically actuating an intake valve of the internal combustion engine 200, wherein a valve control time of the intake valve is controllable by the valve train (not shown).

Further, the mixture supply system 300 includes a charging system 310 connectable to the internal combustion engine 200. The turbocharging system 310 may include a low pressure turbocharger 330, wherein the low pressure turbocharger 330 includes a low pressure compressor 319 and a low pressure turbine 326 connected by a low pressure turbocharger shaft 325. A gas mixer 327 may be connected to an inlet portion of the low-pressure compressor 319, wherein the gas mixer 327 includes a gas supply 314 and/or an air intake device 315.

The charging system 310 may include a high pressure turbocharger 340, wherein the high pressure turbocharger 340 includes a high pressure compressor 311 and a high pressure turbine 312 connected by a turbocharger shaft 313.

The charging system 310 may include a conduit for connecting an outlet region of the low-pressure compressor 319 to an inlet region of the high-pressure compressor 311. An intercooler 318 may be arranged in the conduit.

An inlet region of the high pressure turbine 312 may be connectable to an exhaust manifold 230. An outlet region of the high pressure turbine 312 may be connectable to an inlet region of the low pressure turbine 326.

An outlet region of the high pressure compressor 311 may be connectable to an inlet manifold 220 of the internal combustion engine 200 by means of a connecting line. An intercooler 316 and/or a throttle valve 317 may be connected in the connecting line.

The system 310 includes a bypass 320. The bypass 320 may include a mixture recirculation line 322 and an exhaust bypass line 323. A bypass valve 321, 324 is disposed in the bypass. In particular, a bypass valve 321, 324 are arranged in each of the mixture return line 322 and the exhaust gas bypass line 323. The bypass 320 may connect the inlet portion of the high-pressure turbine 312 of the high-pressure turbocharger 340 to the outlet portion of the high-pressure turbine 312 of the high-pressure turbocharger 340, and the outlet portion of the high-pressure compressor 311 of the high-pressure turbocharger 340 to the inlet portion of the low-pressure compressor 319 of the low-pressure turbocharger 330.

The internal combustion engine 200 may include at least one cylinder 210. The at least one cylinder may be connected to the inlet manifold 220 and/or the exhaust manifold 230. The internal combustion engine 200 may include at least one intake valve, wherein the intake valve is disposed between the inlet manifold 220 and the cylinder 210 (not shown). The intake valve may be periodically actuated by the valve train, wherein a valve control time of the intake valve is controllable by the valve train. A gas supply of the internal combustion engine 200 may be provided via the charging system 310 by means of the gas supply 314 connected to the gas mixer 327 and/or via a separate gas injection 201, in particular via the gas injection 201 connected to the inlet manifold 220.

Figure 3:
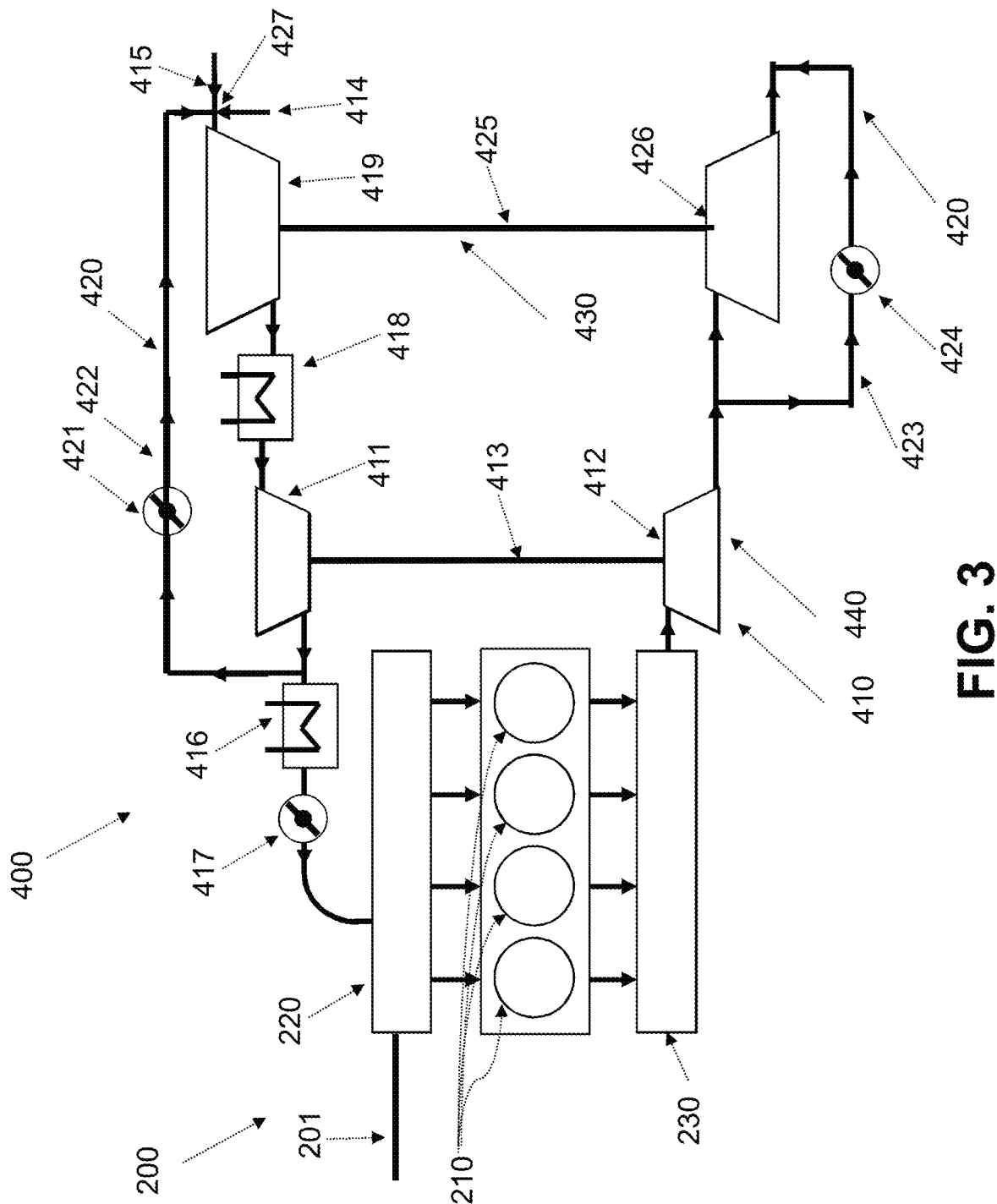

FIG. 3 illustrates the mixture supply system 400. The mixture supply system 400 includes a valve train for periodically actuating an intake valve of the internal combustion engine 200, wherein a valve control time of the intake valve is controllable by the valve train (not shown).

Further, the mixture supply system 400 includes a charging system 410 connectable to the internal combustion engine 200. The charging system 410 may include a low pressure turbocharger 430, wherein the low pressure turbocharger 430 includes a low pressure compressor 419 and a low pressure turbine 426 connected by means of a low pressure turbocharger shaft 425. A gas mixer 427 may be connected to an inlet portion of the low-pressure compressor 419, wherein the gas mixer 427 includes a gas supply 414 and/or an air intake device 415.

The supercharging system 410 may include a high pressure turbocharger 440, wherein the high pressure turbocharger 440 includes a high pressure compressor 411 and a high pressure turbine 412 connected by a turbocharger shaft 413.

The turbocharging system 410 may include a conduit for connecting an outlet region of the low-pressure compressor 419 to an inlet region of the high-pressure compressor 411. An intercooler 418 may be disposed in the conduit.

An inlet region of the high pressure turbine 412 may be connectable to an exhaust manifold 230. An outlet region of the high pressure turbine 412 may be connectable to an inlet region of the low pressure turbine 426.

An outlet region of the high pressure compressor 411 may be connectable to an inlet manifold 220 of the internal combustion engine 200 by means of a connecting line. An intercooler 416 and/or a throttle valve 417 may be connected in the connecting line.

The charging system 410 includes a bypass 420. The bypass 420 may include a mixture return line 422 and an exhaust gas bypass line 423. A bypass valve 421, 424 is disposed in the bypass 420. In particular, a bypass valve 421, 424 are arranged in each of the mixture return line 422 and the exhaust gas bypass line 423. The bypass 420 may connect the inlet portion of the low-pressure turbine 426 of the low-pressure turbocharger 430 to the outlet portion of the low-pressure turbine 426 of the low-pressure turbocharger 430, and the outlet portion of the high-pressure compressor 411 of the high-pressure turbocharger 440 to the inlet portion of the low-pressure compressor 419 of the low-pressure turbocharger 430.

The internal combustion engine 200 may include at least one cylinder 210. The at least one cylinder may be connected to the inlet manifold 220 and/or the exhaust manifold 230. The internal combustion engine 200 may include at least one intake valve, wherein the intake valve is disposed between the inlet manifold 220 and the cylinder 210 (not shown). The intake valve may be periodically actuated by the valve train, wherein a valve control time of the intake valve is controllable by the valve train. A gas supply of the internal combustion engine 200 may be provided via the charging system 410 by means of the gas supply 414 connected to the gas mixer 427 and/or via a separate gas injection 201, in particular via the gas injection 201 connected to the inlet manifold 220.

Figure 4:
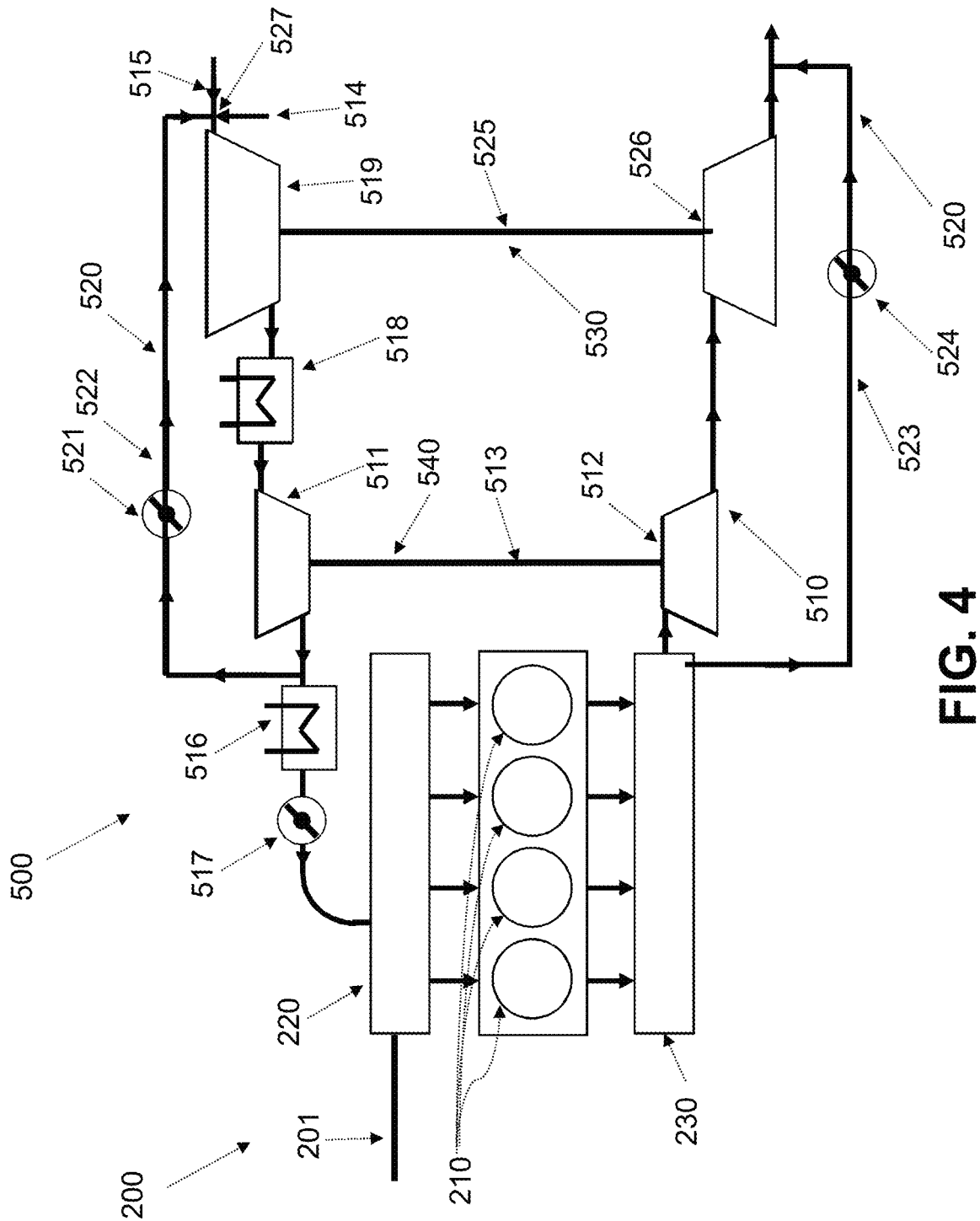

FIG. 4 illustrates the mixture supply system 500. The mixture supply system 500 includes a valve train for periodically actuating an intake valve of the internal combustion engine 200, wherein a valve control time of the intake valve is controllable by the valve train (not shown).

Further, the mixture supply system 500 includes a charging system 510 connectable to the internal combustion engine 200. The charging system 510 may include a low pressure turbocharger 530, wherein the low pressure turbocharger 530 includes a low pressure compressor 519 and a low pressure turbine 526 connected by means of a low pressure turbocharger shaft 525. A gas mixer 527 may be connected to an inlet portion of the low-pressure compressor 519, wherein the gas mixer 527 includes a gas supply 514 and/or an air intake device 515.

The charging system 510 may include a high pressure turbocharger 540, wherein the high pressure turbocharger 540 includes a high pressure compressor 511 and a high pressure turbine 512 connected by a turbocharger shaft 513.

The turbocharging system 510 may include a conduit for connecting an outlet region of the low-pressure compressor 519 to an inlet region of the high-pressure compressor 511. An intercooler 518 may be disposed in the conduit.

An inlet region of the high pressure turbine 512 may be connectable to an exhaust manifold 230. An outlet region of the high pressure turbine 512 may be connectable to an inlet region of the low pressure turbine 526.

An outlet region of the high pressure compressor 511 may be connectable to an inlet manifold 220 of the internal combustion engine 200 by means of a connecting line. An intercooler 516 and/or a throttle valve 517 may be connected in the connecting line.

The charging system 510 includes a bypass 520. The bypass 520 may include a mixture return line 522 and an exhaust gas bypass line 523. A bypass valve 521, 524 is disposed in the bypass 520. In particular, a bypass valve 521, 524 are arranged in each of the mixture return line 522 and the exhaust gas bypass line 523. The bypass 520 may connect the inlet region of the high-pressure turbine 512 of the high-pressure turbocharger 540 to the outlet region of the low-pressure turbine 526 of the low-pressure turbocharger 530, and the outlet region of the high-pressure compressor 511 of the high-pressure turbocharger 540 to the inlet region of the low-pressure compressor 519 of the low-pressure turbocharger 530.

The internal combustion engine 200 may include at least one cylinder 210. The at least one cylinder may be connected to the inlet manifold 220 and/or the exhaust manifold 230. The internal combustion engine 200 may include at least one intake valve, wherein the intake valve is disposed between the inlet manifold 220 and the cylinder 210 (not shown). The intake valve may be periodically actuated by the valve train, wherein a valve control time of the intake valve is controllable by the valve train. A gas supply of the internal combustion engine 200 may be provided via the charging system 510 by means of the gas supply 514 connected to the gas mixer 527 and/or via a separate gas injection 201, in particular via the gas injection 201 connected to the inlet manifold 220.

Although specific embodiments have been illustrated and described herein, it is within the scope of the present invention to suitably combine or modify the embodiments shown without departing from the scope of the present invention. For example, the mixture return line 122, 322, 422, 522 may connect the inlet portion of the high pressure turbine of the high pressure turbocharger to the outlet portion of the high pressure turbine of the high pressure turbocharger. For example, the mixture return line 122, 322, 422, 522 may connect the inlet region of the low pressure turbine of the low pressure turbocharger to the outlet region of the low pressure turbine of the low pressure turbocharger. For example, the throttling device, in particular the throttle valve, may be arranged in the air intake device upstream of the gas mixer. Alternatively, the throttle device, in particular the throttle valve, may be arranged, for example, in the line between the low-pressure compressor and the high-pressure compressor. For example, the gas intake device, and in particular the gas mixer, may be arranged in the line between the low-pressure compressor and the high-pressure compressor.

LIST OF REFERENCE SIGNS

- 100, 300, 400, 500 Mixture supply system
- 110, 310, 410, 510 Charging system
- 140, 340, 440, 540 Turbocharger/high-pressure turbocharger
- 111 Compressor
- 112 Turbine
- 113, 313, 413, 513 Turbocharger shaft
- 114, 314, 414, 514 Gas supply system
- 115, 315, 415, 515 Air intake device
- 116, 316, 416, 516 Intercooler
- 117, 317, 417, 517 Throttle valve
- 127, 327, 427, 527 Gas mixer
- 120, 320, 420, 520 Bypass
- 121, 124, 321, 324, 421, 424, 521, 524 Bypass valve;
- 122, 322, 422, 522 mixture return line
- 123, 323, 423, 523 Exhaust gas bypass line
- 200 Internal combustion engine
- 201 Gas injection
- 210 Cylinder
- 220 Inlet manifold
- 230 Exhaust manifold
- 330, 430, 530 Turbocharger/low-pressure turbocharger
- 311, 411, 511 High-pressure compressor
- 312, 412, 512 High-pressure turbine
- 318, 418, 518 Intercooler
- 319, 419, 519 Low-pressure compressor
- 325, 425, 525 Low-pressure turbocharger shaft
- 326, 426, 526 Low-pressure turbine

The invention claimed is:

1. A mixture supply system for an internal combustion engine with quantitative mixture control the mixture supply system comprising:
a charging system connectable to the internal combustion engine, comprising a bypass and a bypass valve arranged in the bypass;
a valve train for periodically actuating an intake valve of the internal combustion engine, wherein a valve control time of the intake valve is controllable by the valve train;
a control unit configured to control the charging system and valve train;
wherein the mixture supply system is configured to,
upon the increase of an engine load, the control unit at least partially closes the bypass valve and changes the valve control time for extending the valve opening duration, and during and/or after expiration of a valve train latency time, the control unit at least partially opens the bypass valve; and/or
upon a reduction of the engine load, the control unit at least partially opens the bypass valve and changes the valve control time for a reduction of the valve opening duration, and at least partially closes the bypass valve during and/or after expiration of a valve train latency time.

2. The mixture supply system according to claim 1, wherein the control unit is configured to adjust the opening degree of the bypass valve during and/or after expiration of the valve train latency time, depending on a fuel-air ratio in a combustion chamber of the combustion engine with quantitative mixture control.

3. The mixture supply system according to claim 1, wherein a first opening degree of the bypass valve before the increase of the engine load and a second opening degree after the expiration of the valve train latency time are substantially equal.

4. The mixture supply system according to claim 1, the charging system further comprising at least one turbocharger, wherein the bypass connects an inlet region of a turbine of the turbocharger to an outlet region of the turbine of the turbocharger and/or an outlet region of a compressor of the turbocharger to an inlet region of the compressor of the turbocharger.

5. The mixture supply system according to claim 1, the charging system further comprising at least two turbochargers, wherein the bypass connects an inlet region of a turbine of the first turbocharger to an outlet region of a turbine of the second turbocharger and/or an outlet region of a compressor of the first turbocharger to an inlet region of a compressor of the second turbocharger.

6. The mixture supply system according to claim 1, wherein the bypass valve is a throttle valve and/or wherein the bypass valve is infinitely adjustable.

7. The mixture supply system according to claim 1, wherein the valve train is configured to time shift a closing movement of the intake valve; or wherein the valve train is configured to time shift actuation of the intake valve.

8. The mixture supply system according to claim 7, wherein the time shifting of the closing movement of the intake valve is infinitely adjustable.

9. The mixture supply system according to claim 1, further comprising delaying the closing movement of the intake valve.

10. The mixture supply system according to claim 9, wherein a hydraulic chamber is used for delaying the closing movement of the intake valve by means of a hydraulic medium.

11. The mixture supply system according to claim 1, wherein the mixture supply system is configured to at least partially close the bypass valve in a first half of the valve train latency time upon the increase of the engine load; and/or to at least partially open the bypass valve in the first half of the valve train latency time upon the decrease of the engine load.

12. An internal combustion engine with quantitative mixture control, comprising the mixture supply system according to claim 1.

13. A method for operating a mixture supply system for an internal combustion engine with quantitative mixture control, comprising a mixture supply system according claim 1, the method comprising:
A) Upon the increase of an engine load:
A1) partially closing the bypass valve and shifting the valve control time to increase the valve opening duration; and A2) partially opening the bypass valve during and/or after expiration of a valve train latency time; and/or B) Upon the reduction of the engine load:

B1) partially opening the bypass valve and shifting the valve control time to shorten the valve opening time; and B2) partially closing the bypass valve during and/or after expiration of a valve train latency time.

14. The method according to claim 13, wherein steps A2) and/or B2) are adjusted depending on the fuel-air ratio.

* * * * *